(12) United States Patent
Weng

(10) Patent No.: US 11,143,933 B2
(45) Date of Patent: Oct. 12, 2021

(54) CAMERA ASSEMBLY

(71) Applicant: FUNDER ELECTRONIC GLOBAL CO., LTD., Taipei (TW)

(72) Inventor: Wai-How Weng, Taipei (TW)

(73) Assignee: FUNDER ELECTRONIC GLOBAL CO., LTD., Taipei (TW)

( * ) Notice: Subject to any disclaimer, the term of this patent is extended or adjusted under 35 U.S.C. 154(b) by 72 days.

(21) Appl. No.: 16/790,756

(22) Filed: Feb. 14, 2020

(65) Prior Publication Data
US 2020/0218129 A1   Jul. 9, 2020

Related U.S. Application Data

(63) Continuation-in-part of application No. 16/243,053, filed on Jan. 8, 2019, now abandoned.

(51) Int. Cl.
| | |
|---|---|
| *G03B 17/12* | (2021.01) |
| *G03B 5/00* | (2021.01) |
| *H04N 5/225* | (2006.01) |
| *G03B 11/00* | (2021.01) |

(52) U.S. Cl.
CPC ............... *G03B 5/00* (2013.01); *G03B 11/00* (2013.01); *G03B 17/12* (2013.01); *H04N 5/2254* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 2003/0161049 A1* | 8/2003 | Okada ............... | H04N 5/23296 359/696 |
| 2005/0083431 A1* | 4/2005 | Tsutsumi ............ | H04N 5/2254 348/360 |
| 2007/0211162 A1* | 9/2007 | Kaihara .............. | H04N 5/2254 348/335 |
| 2008/0106805 A1* | 5/2008 | Aiba .................... | G02B 26/007 359/723 |
| 2012/0008930 A1* | 1/2012 | Barley .................. | G03B 11/00 396/155 |
| 2015/0042818 A1* | 2/2015 | Wada ................... | H04N 5/2254 348/164 |
| 2019/0163242 A1* | 5/2019 | Zeng .................... | G06F 1/1686 |
| 2020/0007730 A1* | 1/2020 | Doi ......................... | G03B 9/02 |

* cited by examiner

*Primary Examiner* — Clayton E. LaBalle
*Assistant Examiner* — Dennis Hancock
(74) *Attorney, Agent, or Firm* — Leong C. Lei

(57) ABSTRACT

The camera assembly includes an enclosure, a carrier plate, a driver, and a lens barrel. The enclosure has a front side, and a back side, and a channel inside. The channel connects a lens barrel socket on the front side. The lens barrel is coupled to the lens barrel socket. The channel also connects a chamber inside the enclosure. The carrier plate and driver are housed in the chamber. A number of filters are on the carrier plate. The driver engages the carrier plate to move reciprocally so that a filter is aligned with the channel. The chamber is sealed by a cover piece. By integrating the carrier plate, filters, driver, image sensor chip, and enclosure together, the camera assembly has simplified structure and reduced dimension for effective miniaturization.

6 Claims, 11 Drawing Sheets

CAMERA ASSEMBLY

CROSS REFERENCE TO RELATED APPLICATIONS

This is a continuation-in-part application of co-pending U.S. patent application Ser. No. 16/243,053, "Lens Screening Device", filed on Jan. 8, 2019.

BACKGROUND OF THE INVENTION

(a) Technical Field of the Invention

The present invention is generally related to camera modules, and more particular to a camera assembly for camera modules.

(b) Description of the Prior Art

A camera assembly used on electronic appliances such as digital cameras, mobile phones, computers, etc., often involves a lens barrel, filters, and an image sensor chip to sense and capture images, and to convert the image into data.

As shown in FIG. 1, a conventional camera assembly has the above mentioned lens barrel 6a, image sensor chip 7a, and filter 31a integrated to an enclosure 1a. The lens in the lens barrel 6a is aligned with a filter 31a and the image sensor chip 7a in the enclosure 1a. The image sensor chip 7a therefore senses and captures images through the filter 31a and the lens of the lens barrel 6a. Usually there are two filters 31a side-by-side arranged in the enclosure 1a, and a driver 4a switches between the filters 31a according to the day or night lighting condition so that the image sensor chip 7a may obtain an image of appropriate colors through the filters 31a.

The conventional filters 31a and driver 4a are usually pre-assembled in an independent filter package 8a, and the filter package 8a is then disposed in the enclosure 1a between the lens barrel 6a and the image sensor chip 7a. The enclosure 1a as such requires a chamber 16a for accommodating the filter package 8a. The conventional enclosure 1a therefore has a complex structure, leading to higher production cost and difficulty in the miniaturization of the camera assembly.

SUMMARY OF THE INVENTION

A major objective of the present invention is to provide a camera assembly, including an enclosure, a carrier plate, filters, and a driver. The enclosure has a lens barrel socket on a front side, a chamber along a back side, a channel connecting the lens barrel socket and the chamber, and a cover piece sealing the chamber. The carrier plate is disposed in the space. A number of filters are disposed on the carrier plate. The driver engages the carrier plate to move laterally and reciprocally so that a filter on the carrier plate is aligned with the channel.

The chamber has a space and the carrier plate is guided from an upper wall and a lower wall of the space and is moveable laterally and reciprocally in the space. The driver is disposed to a side of the space.

The carrier plate has a slot and the driver has a swing arm with an end extended into the slot so as to engage the carrier plate.

A first end of the swing arm has an extension running through the slot to be located to a side of the carrier plate opposite to the swing arm during the carrier plate's lateral reciprocal movement when it is engaged by the swing arm.

The extension is connected to pin on the first end of the swing arm and the pin is slidably positioned in the slot. The extension therefore functions as a hook engaging the slot.

The driver includes a first electromagnetic arm, a second electromagnetic arm, and a magnetic element. The first electromagnetic arm and the second electromagnetic arm have an end connected together and respectively have curved sections on another ends. The curved sections face each other. The first electromagnetic arm and the second electromagnetic arm are respectively wound in windings. The magnetic element is held between curved sections, and the swing arm has a second end coupled to an axle of the magnetic element.

The swing arm has a protrusion on a top side of a second end. The magnetic element has a notch on a bottom side. The swing arm and magnetic element are coupled by embedding the protrusion in the notch. Alternatively, the magnetic element has an axle channel connected to a square indentation on a top side of the magnetic element. Correspondingly, a top end of an axle on the second end of the swing arm has a square block. As the swing arm's axle is plugged in the magnetic element's axle channel, the square block is received by the square indentation.

The camera assembly further include a cover piece sealing the chamber. The cover piece has an opening corresponding to the channel surrounded by a circumferential flange on a back side of the cover piece surrounding a chip space.

The camera assembly further includes an image sensor chip disposed in the chip space so that the filter is between the channel and image sensor chip.

The camera assembly further includes a lens barrel plugged in the lens barrel socket.

As described above, by having the chamber inside the enclosure to integrate the carrier plate, filters, driver, and image sensor chip with the enclosure, there is no need for a chamber to house the filter package as taught by the prior art. The camera assembly therefore has a simplified structure, a reduced cost, and may be more effectively miniaturized.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
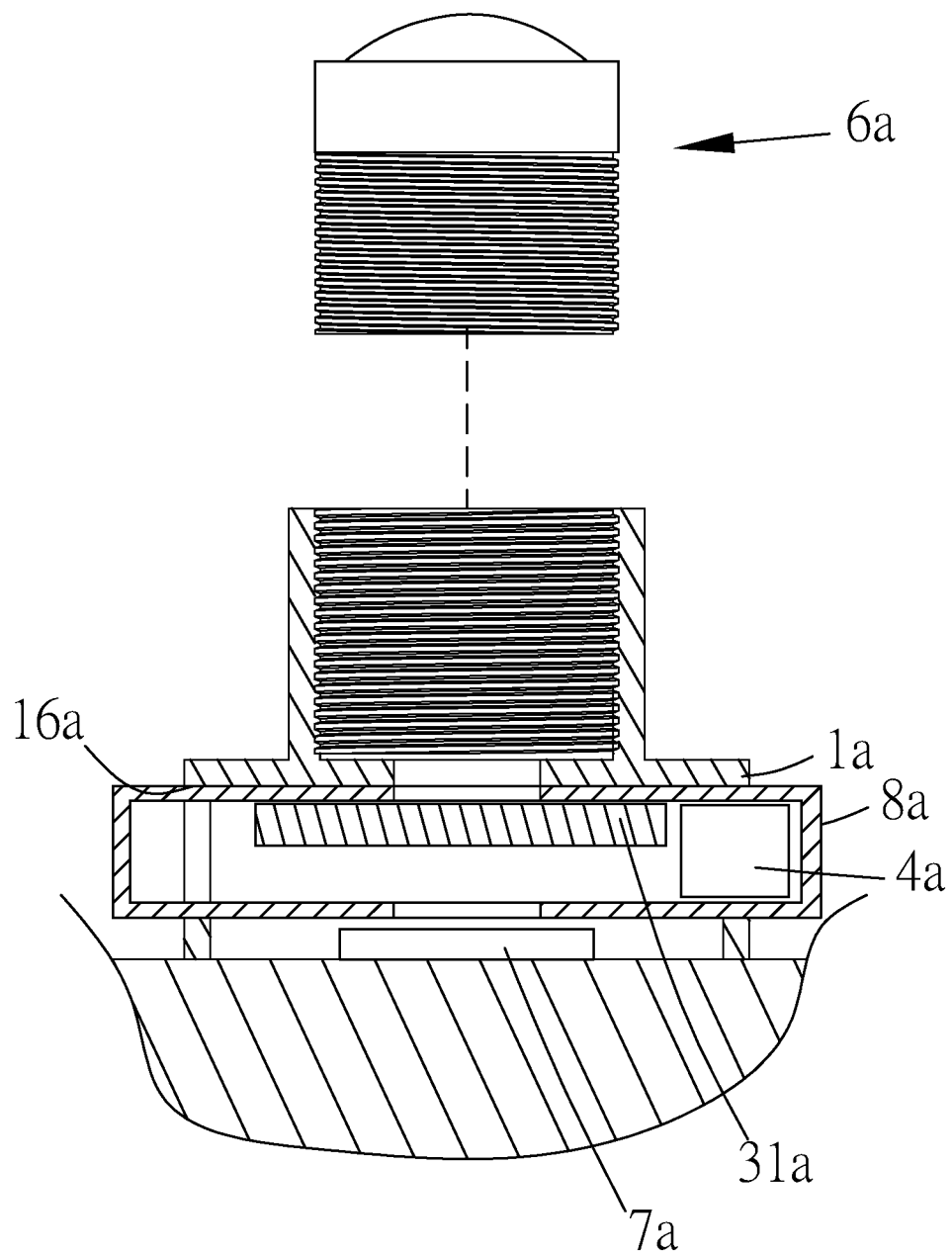
FIG. 1 is a sectional diagram showing a conventional camera assembly.
Figure 2:
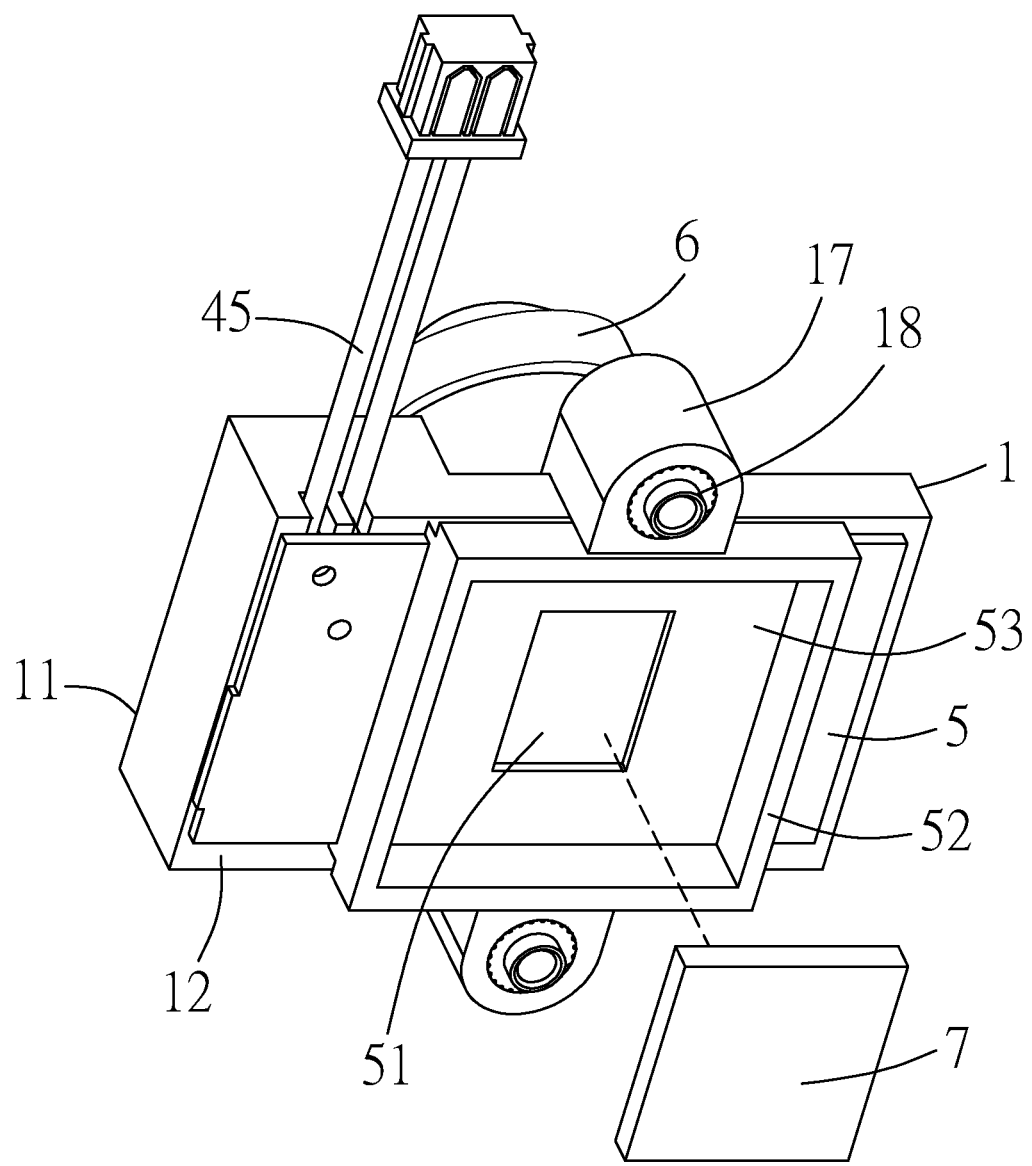
FIG. 2 is a perspective diagram showing a camera assembly according to an embodiment of the present invention.
Figure 3:
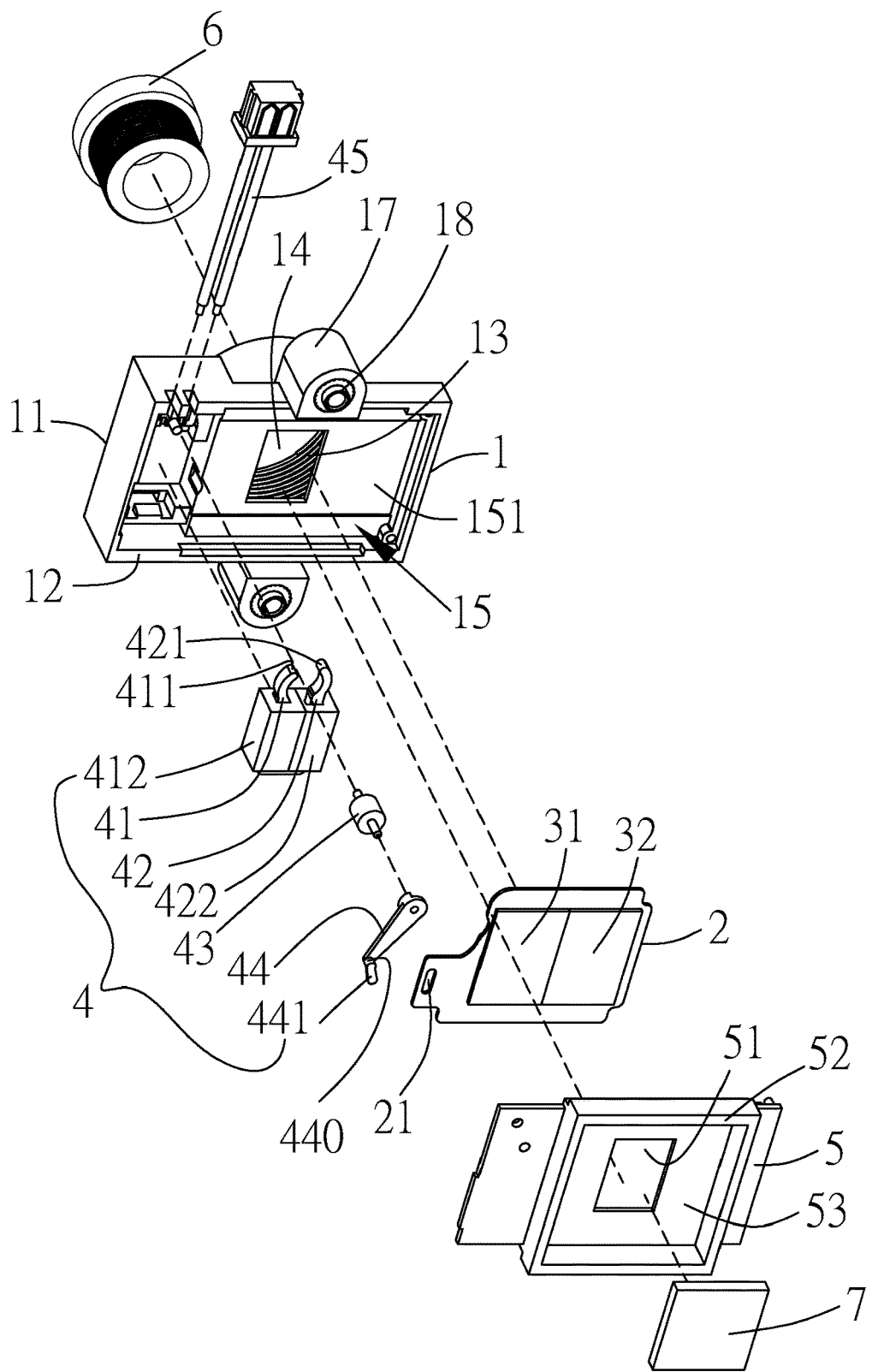
FIG. 3 is a perspective break-down diagram showing the camera assembly of FIG. 2.
Figure 4:
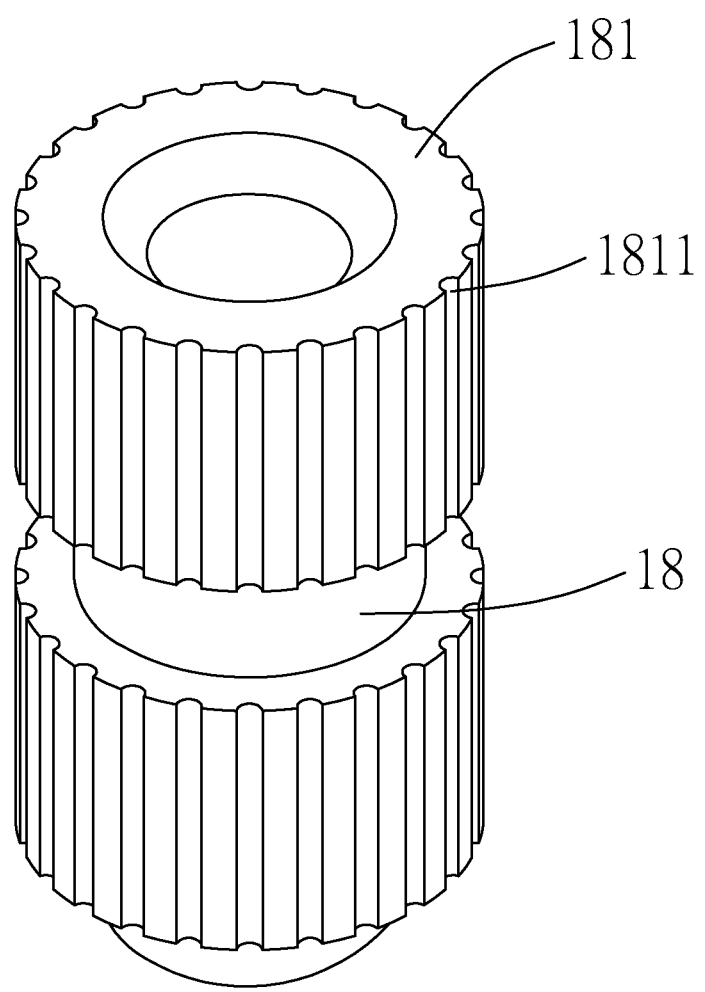
FIG. 4 is a perspective diagram showing a bolt of the camera assembly of FIG. 3.

As shown in FIGS. 2 to 4, a camera assembly according to an embodiment of the present invention includes an enclosure 1, a carrier plate 2, a driver 4, a cover piece 5, and a lens barrel 6. The enclosure 1 has a front side 11 and a back side 12, and the enclosure 1 has a channel 13 inside. The channel 13 has a front end connecting the enclosure 1's front side 11, and, as such, provides a lens barrel socket 14 (as shown in FIG. 3) on the enclosure 1's front side 11. The lens barrel 6 is plugged into the lens barrel socket 14.

Figure 5:
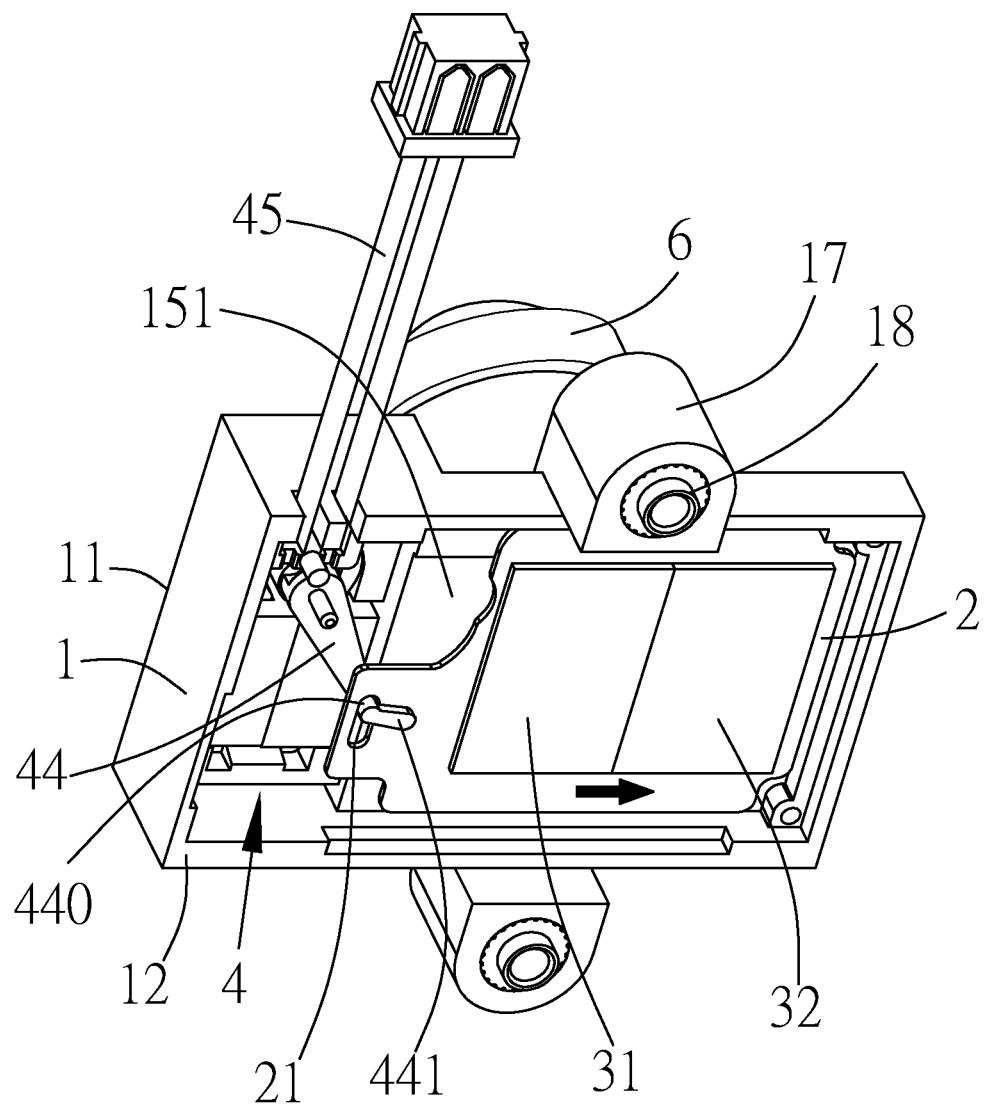
FIG. 5 is a perspective diagram showing a scenario of an enclosure of the camera assembly of FIG. 3.

A back end of the channel 13 connects a chamber 15 of the enclosure 1. The carrier plate 2 and the driver 4 are disposed in a space 151 of the chamber 15. A number of filters 31, 32 are disposed on the carrier plate 2. The carrier plate 2 is guided from an upper wall and a lower wall of the space 151 and is moveable laterally and reciprocally in the space 151. The driver 4 is disposed to a left side or right side of the space 151. The carrier plate 2 provides a slot 21 adjacent to the driver 4. The driver 4 has a swing arm 44 whose free end is embedded in the slot 21 of the carrier plate 2. As shown in FIG. 5, the driver 4's swing arm 44 as such may engage the carrier plate 2 through the slot 21 to move reciprocally and laterally in the space 151 so that a filter 31 or 32 of the carrier plate 2 is aligned with the channel 13.

The cover piece 5 seals the chamber 15 and the cover piece 5 has an opening 51 corresponding to the channel 13 surrounded by a circumferential flange 52 on a back side of the cover piece 5 opposite to the filters 31, 32. The flange 52 forms and surrounds a chip space 53 where an image sensor chip 7 is installed. The filters 31, 32 are therefore disposed between the channel 13 and the image sensor chip 7. The image sensor chip 7 senses and captures images through the lens barrel 6, the channel 13, one of the filters filter 31 and 32, and the opening 51 of the cover piece 5.

As described above, by having the chamber 15 inside the enclosure 1 to directly house the carrier plate 2, filters 31, 32, driver 4, image sensor chip 7, there is no need for a chamber to house the filter package as taught by the prior art. The camera assembly therefore has a simplified structure, a reduced cost, and may be more effectively miniaturized.

As shown in FIGS. 2 to 4, two protrusions 17 are configured along a top side and a bottom side of the enclosure 1. Each protrusion 17 is embedded with a metallic bolt 18 whose circumference is axially configured with a number of gears 181 at intervals. Each gear 181 is configured with teeth 1811. Each bolt 18 is locked to a protrusion 17 by the gears 181 for enhanced reliability. The bolts 18 have an end extended outside the protrusions 17, where fasteners may be applied to fix the enclosure 1 to an external device.

Figure 6:
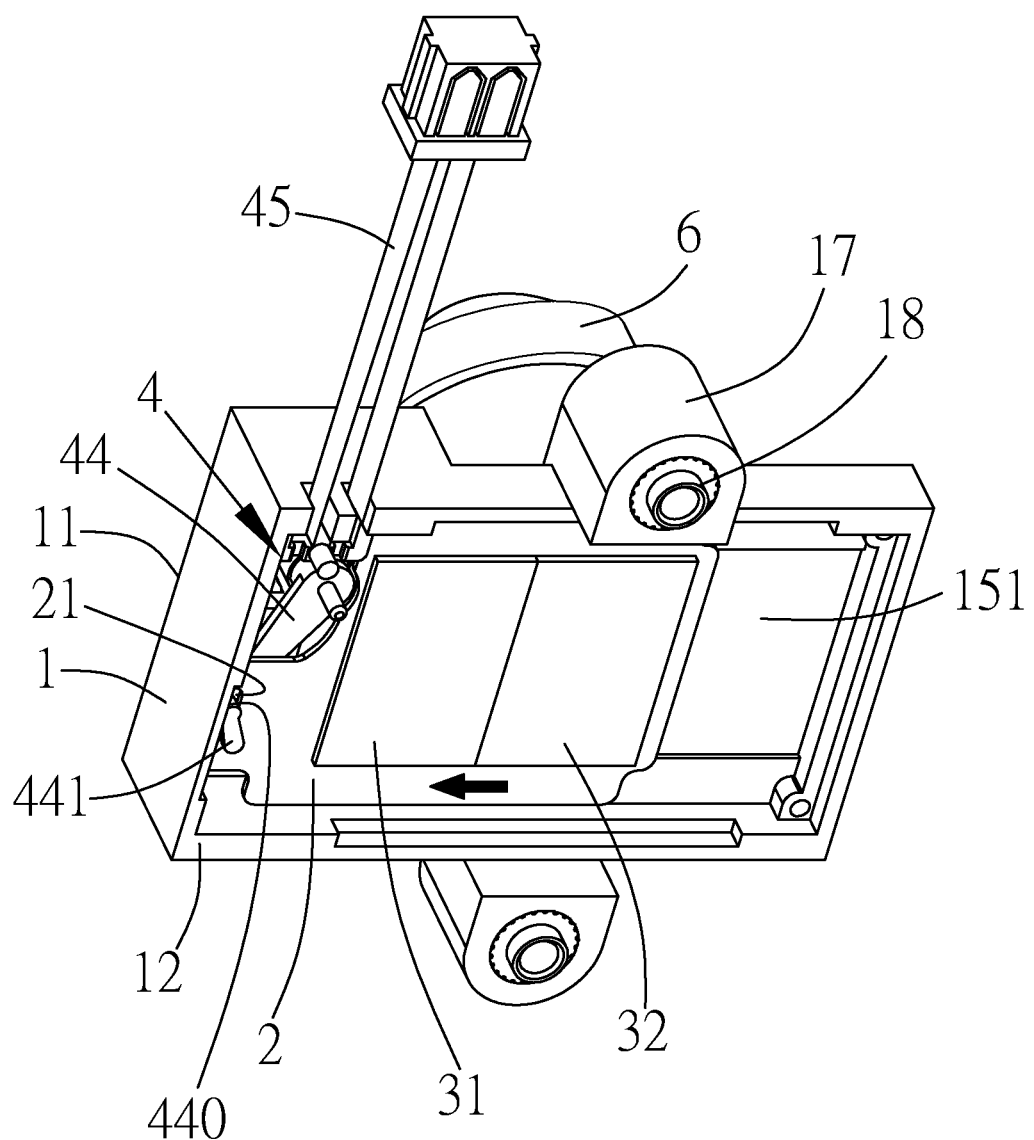
FIG. 6 is a perspective diagram showing another scenario of the enclosure of FIG. 5.
Figure 7:
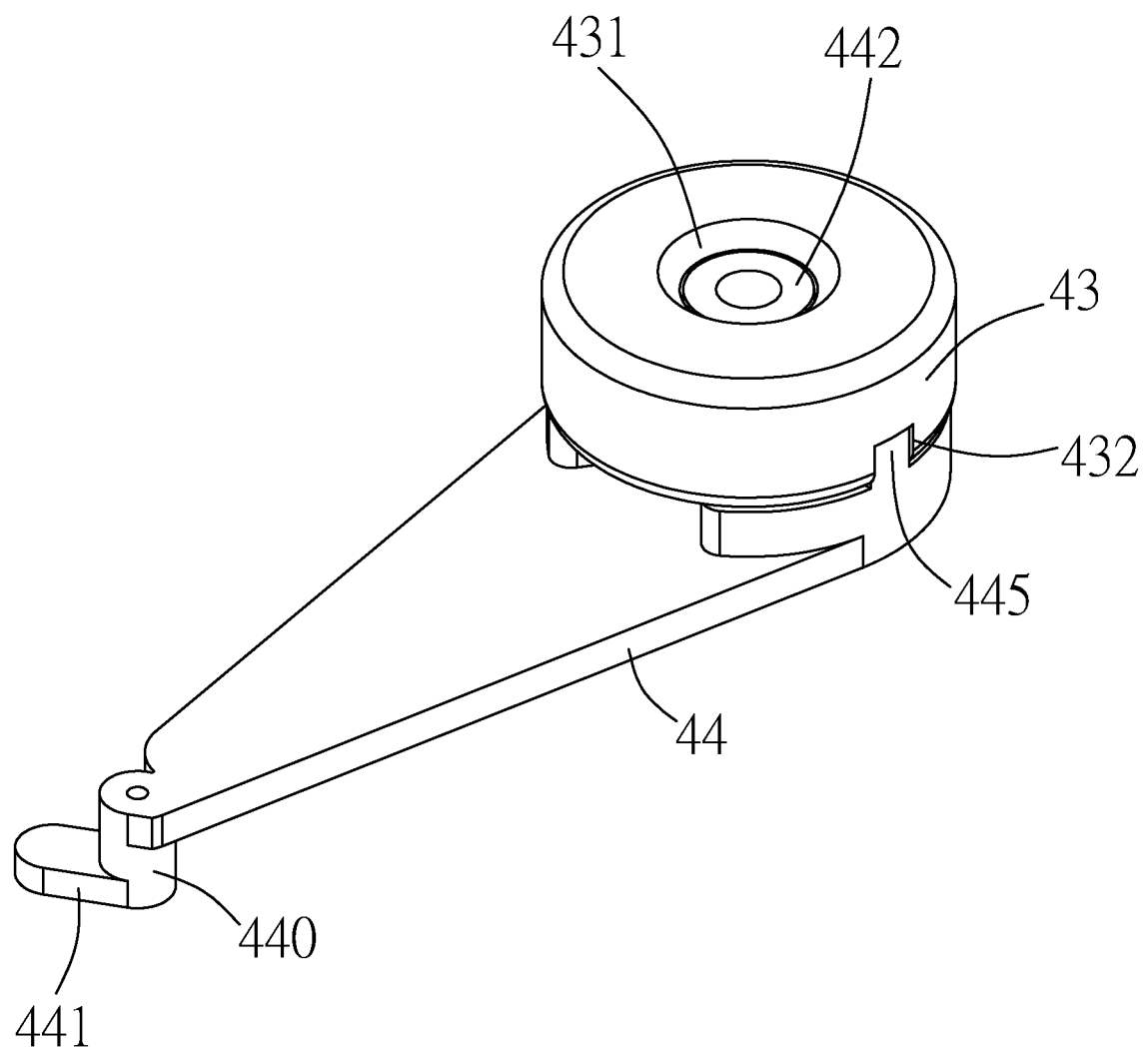
FIG. 7 is a perspective diagram showing a magnetic element and a swing arm of the camera assembly of FIG. 3.

As shown in FIGS. 5 to 7, in one embodiment, the free end of the swing arm 44 has a pin 440 for embedment in the slot 21, and the pin 440 has an extension 441. The extension 441 may run through the slot 21 to be located to another side of the carrier plate 2 opposite to the swing arm 44. The extension 441 therefore functions as a hook engaging the slot 21. As the swing arm 44 drives the carrier plate 2 into a lateral reciprocal movement by the pin 440 and the slot 21, the extension 441 at the free end of the swing arm 44 prevents the swing arm 44 from breaking away from the slot 21, thereby enhancing the reliability of the swing arm 44's engagement to the carrier plate 2.

In one embodiment, the driver 4 includes a first electromagnetic arm 41, a second electromagnetic arm 42, and a magnetic element 43. The first electromagnetic arm 41 and second electromagnetic arm 42 are connected at one end and the other ends of the first electromagnetic arm 41 and second electromagnetic arm 42 respectively provide corresponding curved sections 411, 421 so that the first electromagnetic arm 41's curved sections 411 faces the second electromagnetic arm 42's curved sections 421. The first electromagnetic arm 41 and second electromagnetic arm 42 are respectively wound with windings 412, 422. The magnetic element 43 may be a magnet, and is rotatably held between the curved sections 411, 421. The swing arm 44 is fixedly joined to an axle of the magnetic element 43. The windings 412, 422 are connected to an external power source through a power cable 45. Through the electricity drawn from the external power source through the power cable 45 into the windings 412, 422, the first electromagnetic arm 41 and the second electromagnetic arm 42 produce magnetic force to drive the magnetic element 43, along with the swing arm 44, to swing via the curved sections 411, 421. The carrier plate 2 is thereby moved. With the first electromagnetic arm 41 and second electromagnetic arm 42, windings 412, 422 of greater length may be applied and, as such, a steady magnetic drive is provided to the magnetic element 43 and swing arm 44.

Figure 8:
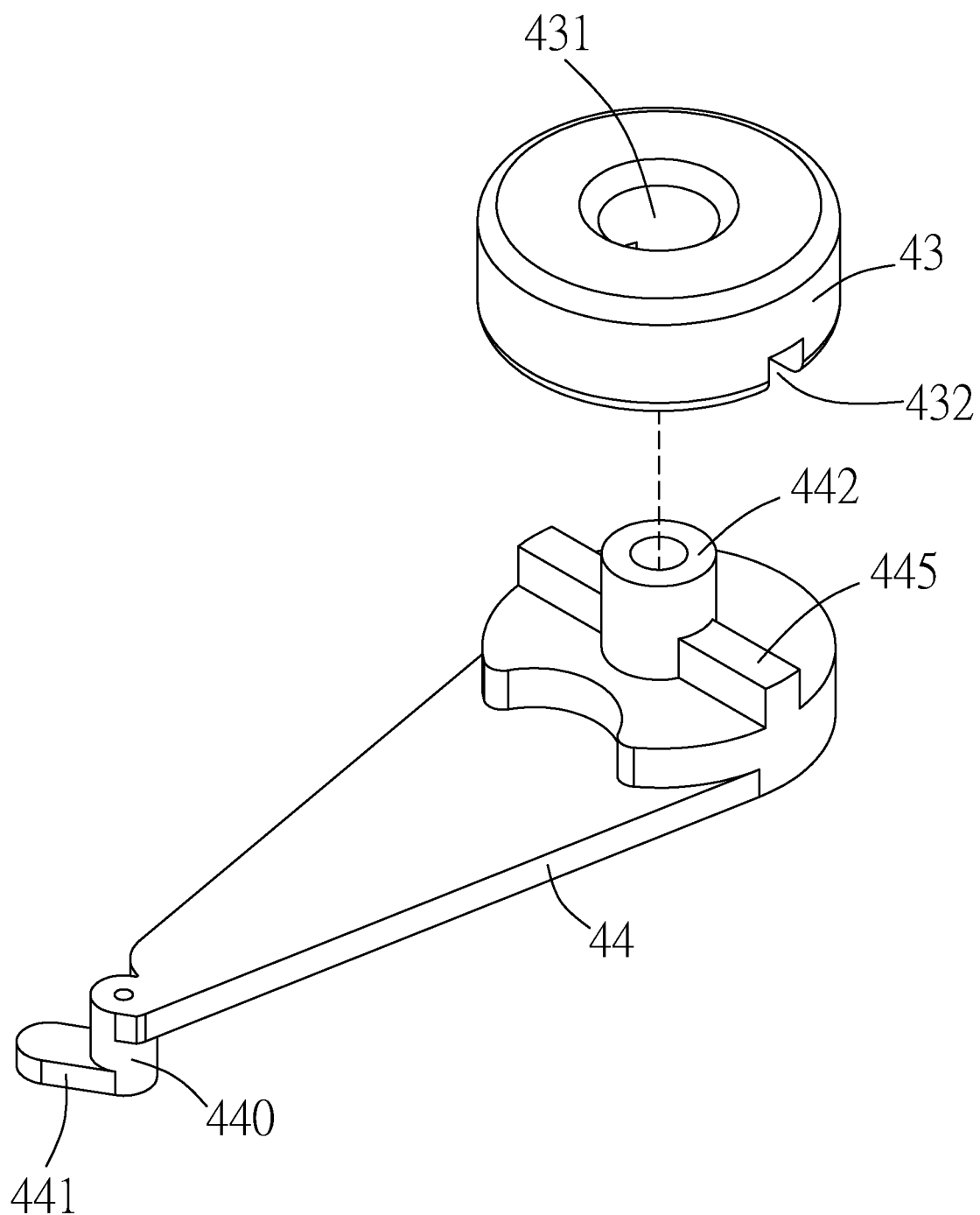
FIG. 8 is a perspective diagram showing the magnetic element and the swing arm of FIG. 7.
Figure 9:
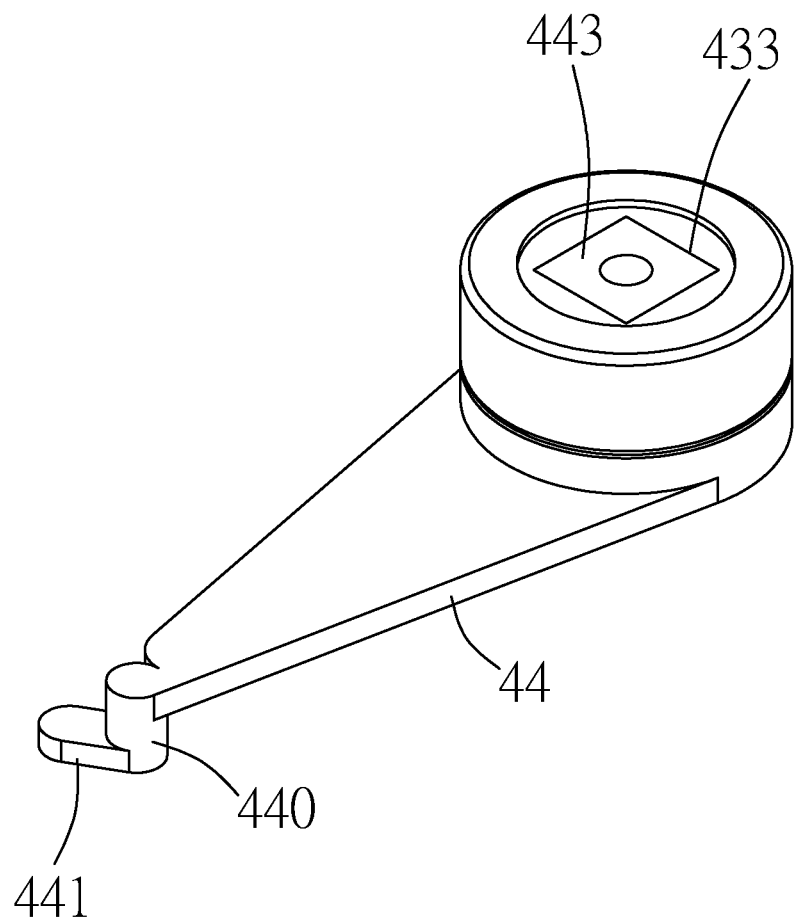
FIG. 9 shows another embodiment of the magnetic element and the swing arm of FIG. 3.
Figure 10:
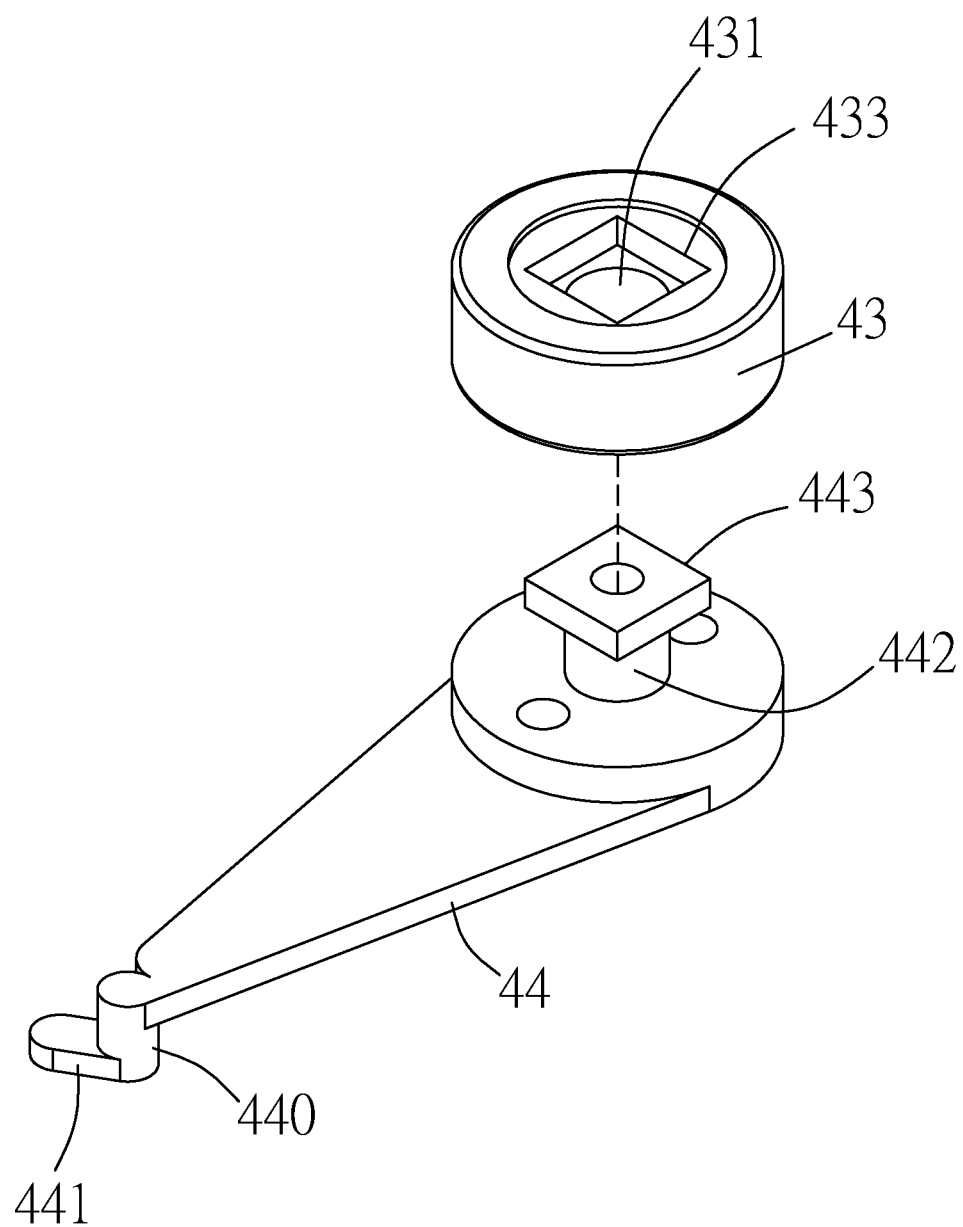
FIG. 10 is a perspective diagram showing the magnetic element and the swing arm of FIG. 9.
Figure 11:
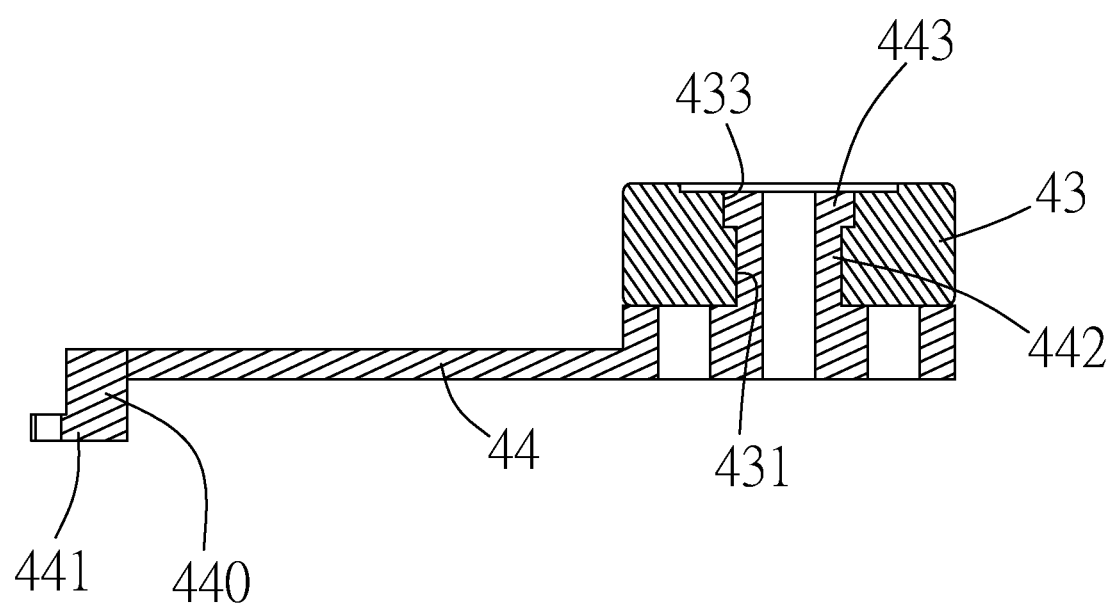
FIG. 11 is a sectional diagram showing the magnetic element and the swing arm of FIG. 9.

As shown in FIGS. 7 and 8, in an alternative embodiment, the swing arm 44 has the extension 441 on a first end and an axle 442 at a second end. At least a protrusion 445 is radially extended from the axle 442. The magnetic element 43 has an end-to-end axle channel 431 and at least a radial notch 432. The magnetic element 43 is mounted on the second end of the swing arm 44 by plugging the axle 442 into the axle channel 431 and the protrusion 445 into the notch 432. Alternatively, as shown in FIGS. 9 to 11, the axle channel 431 is connected to a square indentation 433 on a top side of the magnetic element 43. Correspondingly, a top end of the axle 442 has a square block 443. As the swing arm 44's axle 442 is plugged in the magnetic element 43's axle channel 431, the square block 443 is received by the square indentation 433. As such, the swing arm 44 and the magnetic element 43 may be quickly coupled together.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A camera assembly, comprising:

an enclosure having two protrusions respectively along a top side and bottom side, a lens barrel socket on a front side, a chamber along a back side, a channel connecting the lens barrel socket and the chamber, and a cover piece sealing the chamber, where each protrusion is embedded with a metallic bolt whose circumference is axially configured with a plurality of gears at intervals, each gear is configured with teeth, the bolts are locked to the protrusions by the gears, the bolts have an end extended outside the protrusions, the chamber has a space, and the cover piece has an opening corresponding to the channel surrounded by a circumferential flange on a back side of the cover piece surrounding a chip space;

a carrier plate disposed in the space, where the carrier plate has a slot, the carrier plate is guided from an upper wall and a lower wall of the space and is moveable laterally and reciprocally in the space;

a plurality of filters disposed on the carrier plate;

a driver disposed in the chamber to a side of the space, where the driver comprises a swing arm, a first end of the swing arm has a pin for embedment in the slot, the pin has an extension running through the slot to be located to a side of the carrier plate opposite to the swing arm, the extension therefore functions as a hook engaging the slot;

wherein the driver drives the swing arm which in turn engages the carrier plate into a lateral reciprocal movement by the pin and the slot; the extension at the first end of the swing arm prevents the swing arm from breaking away from the slot; and a filter is moved to be aligned with the channel in the lateral reciprocal movement of the carrier plate.

2. The camera assembly according to claim 1, wherein the driver comprises a first electromagnetic arm, a second electromagnetic arm, and a magnetic element; the first electromagnetic arm and the second electromagnetic arm have an end connected together and respectively have curved sections on another ends; the curved sections face each other; the first electromagnetic arm and the second electromagnetic arm are respectively wound in windings; the magnetic element is held between curved sections; and the swing arm has a second end coupled to an axle of the magnetic element.

3. The camera assembly according to claim 2, wherein the magnetic element has an axle channel connecting a top side and a bottom side of the magnetic element; the axle channel has an indentation on the top side of the magnetic element; the swing arm has an axle on the second end plugging in the axle channel; and the axle has a block at an end received by the indentation.

4. The camera assembly according to claim 3, wherein the swing arm has a protrusion on a top side of a second end; the magnetic element has a notch on a bottom side; and the swing arm and magnetic element are coupled by embedding the protrusion in the notch.

5. The camera assembly according to claim 1, further comprising an image sensor chip disposed in the chip space so that the filter is between the channel and image sensor chip.

6. The camera assembly according to claim 1, further comprising a lens barrel plugged in the lens barrel socket.

* * * * *